(12) United States Patent
Mamillapalli et al.

(10) Patent No.: US 8,346,904 B2
(45) Date of Patent: *Jan. 1, 2013

(54) RELIABLE MULTICAST COMMUNICATION

(75) Inventors: Sudhakar Mamillapalli, San Jose, CA (US); Stephen Paul Belair, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 1448 days.

This patent is subject to a terminal disclaimer.

(21) Appl. No.: 11/495,260

(22) Filed: Jul. 29, 2006

(65) Prior Publication Data
US 2006/0262795 A1 Nov. 23, 2006

Related U.S. Application Data

(63) Continuation of application No. 10/721,939, filed on Nov. 25, 2003, now Pat. No. 7,095,739.

(51) Int. Cl.
*G06F 15/173* (2006.01)
(52) U.S. Cl. ......... 709/223; 709/203; 709/204; 709/238
(58) Field of Classification Search .................. 709/223, 709/203, 204, 238
See application file for complete search history.

(56) References Cited

U.S. PATENT DOCUMENTS

| | | |
|---|---|---|
| 5,161,153 A | 11/1992 | Westmore |
| 5,541,927 A | 7/1996 | Kristol et al. |
| 5,959,989 A | 9/1999 | Gleeson et al. |
| 6,122,483 A | 9/2000 | Lo et al. |
| 6,151,696 A | 11/2000 | Miller et al. |
| 6,377,997 B1 * | 4/2002 | Hayden ......................... 709/231 |
| 6,415,312 B1 | 7/2002 | Boivie |
| 6,418,477 B1 | 7/2002 | Verma |
| 6,532,211 B1 | 3/2003 | Rathonyi et al. |
| 6,683,850 B1 | 1/2004 | Dunning et al. |
| 6,735,177 B1 | 5/2004 | Suzuki |
| 6,760,307 B2 | 7/2004 | Dunning et al. |
| 6,947,434 B2 | 9/2005 | Hundscheidt et al. |
| 6,965,579 B1 | 11/2005 | Shin |

(Continued)

FOREIGN PATENT DOCUMENTS
WO     WO 01/91359 A1     11/2001

OTHER PUBLICATIONS

U.S. Appl. No. 10/722,214, filed Nov. 25, 2003, Belair et al.

(Continued)

*Primary Examiner* — Lan-Dai T Truong
(74) *Attorney, Agent, or Firm* — The Law Office of Kirk D. Williams

(57) ABSTRACT

Disclosed are various ways of performing reliable multicast communication which may include, for example, designating which node or nodes to acknowledge a message and/or whether to immediately acknowledge or delay acknowledgement of a message, which may be of particular use with routers, packet switching systems, computer systems, and other devices. Multiple nodes are typically sent a multicast message, which includes an indication of one or more designated nodes to acknowledge the message, a sequence number or other message identification value, and possibly an indication whether an immediate or delayed acknowledgment is requested. A node receiving the message responds accordingly if it is designated to acknowledge the message, which may include requesting any missing messages, and/or sending an acknowledgment message for the messages it has received since it sent its last acknowledgment message.

24 Claims, 6 Drawing Sheets

U.S. PATENT DOCUMENTS

| | | | |
|---|---|---|---|
| 7,185,099 B1* | 2/2007 | Block | 709/230 |
| 2002/0085506 A1 | 7/2002 | Hundscheidt et al. | |
| 2003/0076826 A1 | 4/2003 | Blasiak et al. | |
| 2003/0083087 A1* | 5/2003 | Ekl et al. | 455/518 |
| 2003/0223422 A1 | 12/2003 | Igarashi et al. | |
| 2003/0227934 A1* | 12/2003 | White et al. | 370/432 |
| 2004/0081149 A1 | 4/2004 | Belair et al. | |
| 2004/0225733 A1* | 11/2004 | Tesink et al. | 709/225 |
| 2005/0002365 A1 | 1/2005 | Xu | |

OTHER PUBLICATIONS

Coulouris et al., Distributed Systems Concepts and Design, Third Edition, Addison-Wesley, Sect. 4.5.1, pp. 154-158, Sect. 11.4, pp. 436-450, 2001.

Douglas E. Comer, "Retransmitting Lost Packets," Computer Networks and Internets, Section 14.10.3, Second Edition, Prentice-Hall, Inc., 1999, p. 212.

The American Heritage Dictionary, Second College Edition, Houghton Mifflin Company, 1982. p. 75.

The Authoritative Dictionary of IEEE Standards Terms, IEEE, Seventh Edition, 2000, p. 10.

PCT International Search Report and The Written Opinion of The International Searching Authority for PCT Application PCT/US04/32146, ISA/US, mailed Sep. 13, 2005 (eleven pages).

Supplementary European Search Report, European Patent Office, Application No. 04789340.9, mailed Oct. 24, 2011 (three pages).

First Office Action, State Intellectual Property Office of the People's Republic of China, Application No. 2004800348279, mailed Dec. 19, 2008 (six pages).

Examination Report, European Patent Office, Application No. 04789340.9, mailed May 4, 2012 (six pages).

* cited by examiner

RELIABLE MULTICAST COMMUNICATION

CROSS-REFERENCE TO RELATED APPLICATIONS

This is a continuation of nonprovisional application Ser. No. 10/721,939, filed Nov. 25, 2003, now U.S. Pat. No. 7,095,739 which is hereby incorporated by reference in its entirety.

TECHNICAL FIELD

One embodiment of the invention relates to communications and computer systems; and more particularly, one embodiment especially relates to reliable multicast communication which may include, for example, designating which node or nodes to acknowledge a message and/or whether to immediately acknowledge or delay acknowledgement of a message, which may be of particular use with routers, packet switching systems, computer systems, and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Multicast communication is often used to communicate information from a single source to a group of destinations (e.g., one or more nodes). In many applications, unreliable multicast messaging is used, and receivers compensate for, or ignore lost messages.

However, in certain applications, information distributed to a group of destinations must be guaranteed to be received by each receiver, and thus some form of reliable communication must be used. For example, a connection could be established between the sender and each receiver, with messages communicated using a reliable transport protocol. However, this technique requires a large amount of resources for generating and send a message to each node, and for the sender of the original message to process each acknowledgment message.

A know system reduces the number of original messages sent by a sending node by a sending multicast message (instead of multiple unicast messages) to a group of receiving nodes, with each receiving node sending an acknowledgement message back to the sender. This reduces the number of messages sent by a sender, but still requires each message to be acknowledged, and the sender must process all the acknowledgment messages. Another system reduces the number of acknowledgment messages received and processed by the sender by inducing a hierarchy of acknowledging nodes, wherein a subset of the multiple receiving nodes acknowledge each particular message to one or multiple intermediate nodes, which in turn send a single acknowledgement message representing itself and the associated other multiple receiving nodes to the sender.

Desired are other forms of reliably communicating to a group of nodes.

SUMMARY

Disclosed are, inter alia, methods, apparatus, data structures, computer-readable medium, mechanisms, and means for reliable multicast communication which may include, for example, designating which node or nodes to acknowledge a message and/or whether to immediately acknowledge or delay acknowledgement of a message, which may be of particular use with routers, packet switching systems, computer systems, and other devices. As the number of embodiments and corresponding applications thereof are extensible, the nodes using such a reliable communication scheme may correspond to different computers, elements, components or other devices, etc., which are connected in some fashion, such as by that including a network, system bus, switching fabric, wire, or any other communications mechanism.

In one embodiment, multiple nodes are sent a multicast message, which includes an indication of one or more designated nodes to acknowledge the message, a sequence number or other message identification value, and possibly an indication whether an immediate or delayed acknowledgment is requested. A node receiving the message responds accordingly if it is designated to acknowledge the message, which may include requesting any missing messages, and/or sending an acknowledgment message for the messages it has received since it sent its last acknowledgment message.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
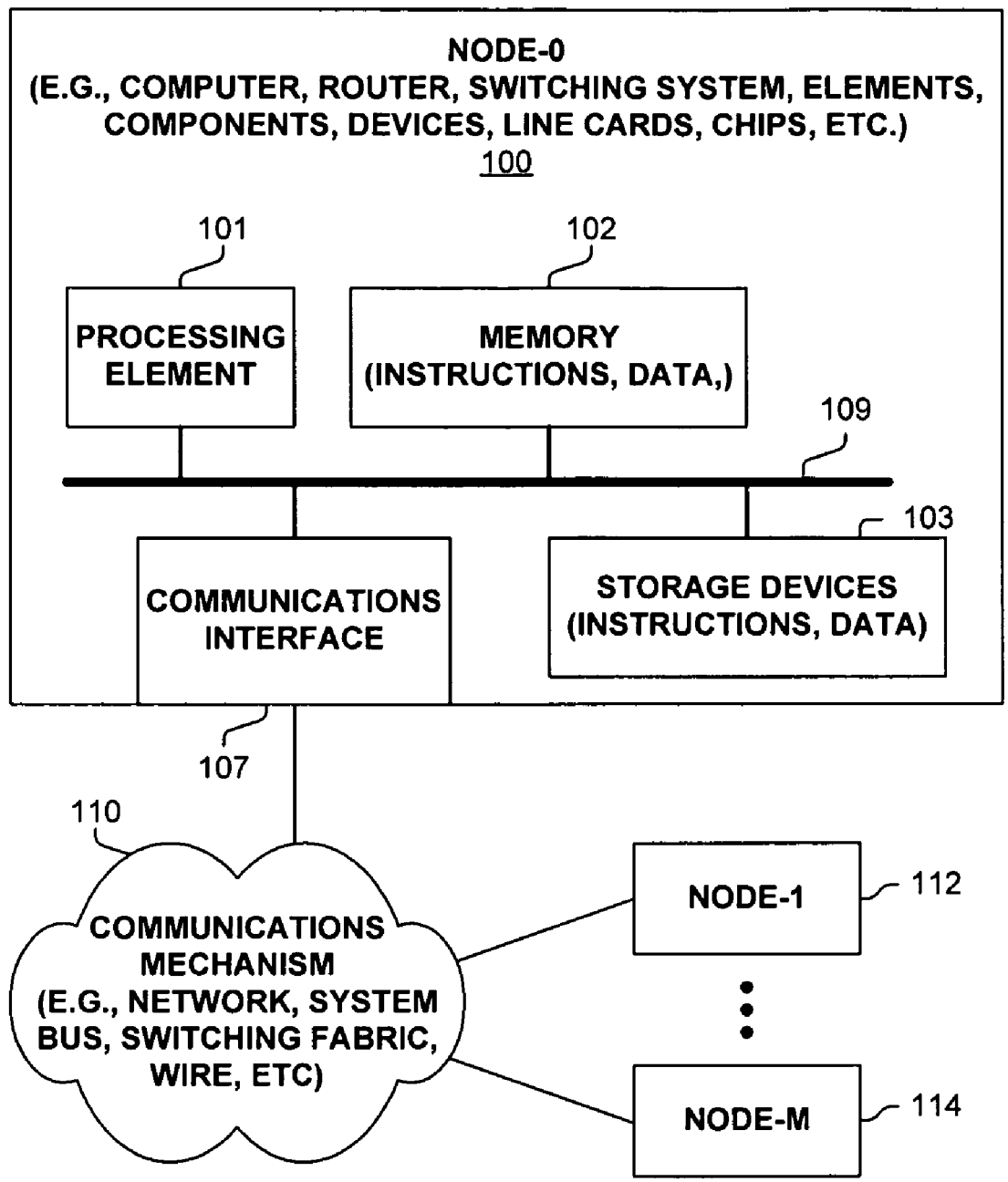
FIG. 1 is a block diagram illustrating an example of a nodes that communicate with each other according to one embodiment of the invention.

Disclosed are, inter alia, methods, apparatus, data structures, computer-readable medium, mechanisms, and means for reliable multicast communication which may include designating one or more nodes to acknowledge a particular message and/or whether to immediately or delay the acknowledgement of a message, which may be of particular use with routers, packet switching systems, computer systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, etc. tangibly embodying computer-readable instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for reliable multicast communication which may include, for example, designating which node or nodes to acknowledge a message and/or whether to immediately acknowledge or delay acknowledgement of a message, which may be of particular use with routers, packet switching systems, computer systems, and other devices. As the number of embodiments and corresponding applications thereof are extensible, the nodes using such a reliable communication scheme may correspond to different computers, elements, components or other devices, etc., which are connected in some fashion, such as by that including a network, system bus, switching fabric, wire, or any other communications mechanism.

In one embodiment, multiple nodes are sent a multicast message, which includes an indication of one or more designated nodes to acknowledge the message, a sequence number or other message identification value, and possibly an indication whether an immediate or delayed acknowledgment is requested. A node receiving the message responds accordingly if it is designated to acknowledge the message, which may include requesting any missing messages, and/or sending an acknowledgment message for the messages it has received since it sent its last acknowledgment message.

FIG. 1 illustrates multiple nodes 100 and 112-114 in a configuration used with one embodiment. Nodes 100 and 112-114 can be individual systems or components (e.g., computers, routers, switching systems, elements, components, devices, line cards, chips, etc.), in other words, basically anything that can send, receive, and process messages. Nodes 100 and 112-114 are connected via a communications mechanism 110 (e.g., a network, bus, switching system, wire, etc.), and over which, messages are sent to at least a subset of nodes 100 and 112-114.

For example, nodes 100 and 112-114 could be within a single packet switching system, router, or other communications devices with nodes 112-114 located on line cards or elsewhere, with node 100 located on a control card, line card, or elsewhere. Thus, nodes 100 and 112-114 could reliably communicate among themselves, such as for, but not limited to dispatching nodes to perform actions, collecting statistics, updating routing information, responding (e.g., updating routing information, re-routing or dropping packets, etc.) error/fault conditions or configuration changes.

FIG. 1 also illustrates a configuration of a node 100 used in one embodiment. Node 100 typically includes mechanisms and means for reliably communicating with one or more other nodes. For example, one embodiment includes a process performing an operation described herein. One embodiment includes a process corresponding to one of the block or flow diagrams illustrated herein, or corresponding to any other means or mechanism implementing all or part of a claim with other internal or external components or devices possibly implementing other elements/limitations of a claim. Additionally, a single or multiple systems, devices, components, etc. may comprise an embodiment.

In one embodiment, node 100 includes a processing element 101, memory 102, storage devices 103, and an interface 104 for receiving and transmitting packets or other items, which are coupled via one or more communications mechanisms 109 (shown as a bus for illustrative purposes).

Various embodiments of node 100 may include more or less elements. The operation of node 100 is typically controlled by processing element 101 using memory 102 and storage devices 103 to perform one or more tasks or processes, such as, but not limited to adjusting values and accordingly updating one or more residue amounts.

Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with one embodiment of the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with one embodiment of the invention.

In one embodiment, the sender of a message knows the identity of all the receivers in the group, or at least those in which reliable communication is desired. Typically, a monotonically increasing sequence number space is used to identify the sequence of messages with the sequence numbers wrapping around after reaching a maximum value; although, any message sequence identification mechanism can be used.

In one embodiment using reliable multicast communication, each message is acknowledged by each receiver. Thus, for each multicast message sent to n receivers, there are n acknowledgement messages sent. In certain applications this works well. However, in certain applications, it would be beneficial if the number of acknowledgement messages could be reduced, while still providing reliable and efficient communication among the nodes.

In one embodiment, receiving nodes acknowledge the highest consecutive sequence number message they have received, but have not already acknowledged or acknowledge every nth message, wherein n is an integer. Thus, the number of acknowledgement messages sent is typically less than, and often significantly less than the number of messages being acknowledged. For example, if a receiver received messages with sequence numbers one, two, three, and six, the receiver only sends an acknowledgment message indicating sequence number three, as this message acknowledges messages with sequence numbers one, two, and three. Only after receipt of messages with sequence numbers four and five does the receiver acknowledge message six (corresponding to sequence numbers four, five, and six). Of course, an individual acknowledgement message could be sent for sequence number four, and then the acknowledgement with sequence number six would correspond to sequence numbers five and six. In one embodiment, another identification mechanism is used to identify the receipt of consecutive and/or non-consecutive sequenced numbered messages, such as using a list and/or bitmap. This is another technique to reduce the number of acknowledgement messages required for reliable communication.

Based on the acknowledgement messages from each of the receiving nodes, at any point in time, the sender of a message knows which messages have been received by each receiving node, and that all receiving nodes have received all messages smaller than a particular earliest (e.g., smallest) sequence number acknowledged. The sender, by buffering the messages later than this particular earliest sequence number, then the sender is able to resend any of these messages to the corresponding receiver(s), and thus, recover any receivers who have fallen behind.

One embodiment reduces the number of acknowledgment messages in an another way, which may or may not be used in conjunction with another reduction scheme. In this scheme, for every message sent by the sender, the sender appoints one or more designated nodes to acknowledge the message, and a node will only acknowledge the message if it is a designated acknowledgment node. The remaining nodes process the message, but do not acknowledge back. A designated node acknowledges this message, and indicates any missing messages which the sender resends to it. For example, in one embodiment, the acknowledging node sends a list, bitmap, or other indication corresponding to the received or missing messages since sending its last acknowledgment message. In one embodiment, a designated acknowledgment receiving node acknowledges the highest consecutive sequence number message that it has received, but has not already acknowledged. If it is missing one or more messages, it sends a request to the sending node in the acknowledgement message or in another message requesting the missing message(s).

Using this scheme, every node need not acknowledge every message. So for N receivers, and assuming that for each message sent, K nodes are chosen as the designated Nodes to acknowledge the number of acknowledges are cut down by a factor of N/K, compared to the case where every message is acknowledged by every receiving node. More specifically, if on every send only one node is chosen as the designated node to acknowledge, the number of acknowledges are reduced by a factor of N.

For example, in one embodiment, one node is selected as the designated node to acknowledge in a round robin fashion. Of course, other embodiments may choose to determine the designated node using any deterministic or non-deterministic (e.g., random) manner. In this example, assume the sender is identified as node zero and there exist four receivers in the group identified as receivers one through four. When the sender sends a first message, it appoints node one as the designated node to acknowledge, for the second message node two, for the third message node three, for the fourth message node four, and finally for the fifth message node one, and so on. So, in this example, no node can fall behind more than four messages. For example, assume receiver one acknowledges message one and then does not receive messages two, three, and four. Because receiver one is not the designated node to acknowledge for messages two through four, the sender is not expecting acknowledges for these messages from receiver one, and hence is unaware of that receiver one is missing them. However, eventually when receiver one is appointed designated node to acknowledge for message five, the sender makes sure that receiver one receives messages two, three and four, because receiver one will not acknowledge message five until all the messages before and including message five have been received. Therefore, in this example, a node can fall behind by at most by M messages, when there are M receiving nodes in the group. Also, the sender is not required to maintain per receiver state; rather, only minimal state identifying the current designated node to acknowledge has to be maintained so that the designated node to acknowledge can be moved from one receiver to the next in a round robin or other fashion.

In one embodiment, the designated node acknowledges every message received from the sender (e.g., there is a window size of one). In one embodiment using a window size of one, the sender waits to receive an acknowledgement from the designated node before it identifies a new node designated to acknowledge, typically using a round robin or other deterministic or non-deterministic ordering. In one embodiment, the window size used is greater than one, which may allow greater throughput. In one embodiment with a window size greater than one, the sender keeps sending messages until the window is full, and as soon as an acknowledgement is received for a message in this window, the designated node to acknowledge can be moved to next receiver. By choosing a appropriate window size, throughput can typically be increased by the sender keeping the pipe between the senders and receivers full.

For example, assume there are four receiving nodes, receivers one to four, with receiver one designated to acknowledge messages with sequence numbers one through ten, receiver two designated to acknowledge messages with sequence numbers eleven through twenty, receiver three designated to acknowledge messages with sequence numbers twenty-one through thirty, and receiver four designated to acknowledge messages with sequence numbers thirty-one through forty. As soon as the sender receives an acknowledgement for a message from the window allocated to receiver one, the sender can move the designated node to acknowledge to receiver two. This could however lead to a receiving node falling behind other nodes by N*W messages, for N receivers and a window size of W. For example, in this case, if node one received message with sequencer number one and acknowledged the message, but missed all other messages from two to forty, recovery could be delayed till receiver one becomes the designated node to acknowledge for messages with sequence numbers forty-one to fifty because the sender might be unaware of the missed messages (this is because based on the protocol the sender does not have to wait for acknowledges for messages two through ten for which node one is the designated node to acknowledge or messages eleven to forty for which node one is not the designated node to acknowledge). So with four receivers and window size of ten, a receiver can fall behind forty messages at most with respect to other receivers in the group. The sender hence needs to buffer a large number of messages in order to ensure all the receivers will eventually receive all the messages the sender sent. Hence, the tradeoff between higher throughput and lower buffer space requirement.

In one embodiment, a side effect of sending a window of messages is that one or more of the receivers might run out of buffer space and might not be able to handle all the messages they receive and are forced to drop some of them. However, the receiving node will not acknowledge messages not processed by it. This has the effect of slowing down the sender, which is what is desired till the slow receiver catches up with the sender. The sender, when it appoints the slow receiver as the designated node to acknowledge, will be forced to wait and make sure this node receives all the messages since the last time it was the designated node to acknowledge. For example, if receiving node one in the above case were the slow node when it becomes the designated node to acknowledge for messages forty-one to fifty, the sender makes sure that message forty and lower and a message between forty-one and fifty have been successfully received by it before moving the designated node to acknowledge to the next node.

Various embodiments may choose the window size differently, such as that based on the available buffer size, the number of messages that could be sent in round trip time, etc. The window size is determined chiefly by the number of messages the sender can buffer.

For example, assume a sender can buffer B messages and the number of receiving nodes are N. Because a node can fall behind at most N*W messages for a window size of W, the sender needs to buffer N*W messages, and thus the buffer space requirement is B greater than or equal to N*W or W is less than or equal to B/N. So, in one embodiment, B/N is maximum window size possible without losing the ability to recover nodes with lost messages. If the sender does not posses enough buffer space, either a smaller window could be used, or more number of designated nodes to acknowledge can be used per message. One embodiment designates a single node to acknowledge a message. One embodiment designates multiple nodes to acknowledge a message.

For example, one embodiment designates A nodes of a total of N nodes to acknowledge each message, so there are N/A sets of nodes. All nodes from a particular set are designated to acknowledge one or more messages before designating a next particular set of nodes to acknowledge one or more messages.

Applying the same logic for a single receiving node to a set of nodes, a set of nodes can fall behind other sets of nodes by at most (N/A)*W messages (because there are N/A sets). For example, with four receivers, receivers one through four, assume the sender designates nodes one and two to acknowledge for the first window of messages, messages one to ten, and nodes three and four to acknowledge for the second window of messages, messages eleven to twenty. In this example with two sets of nodes, a node can fall behind other nodes by only twenty messages, which can be compared with the case of a single set of nodes with each message acknowledged by only one designated receiver node, by forty messages. However, this scheme could lead to more acknowledges, because all nodes in the set need to acknowledge before moving the window to the next receiver. Again for a buffer size available of B messages, in this case maximum window size possible is (W*N/A) is less than or equal to B or W is greater than or equal to B*A/N.

In one embodiment, receiving nodes use immediate and delayed acknowledgements of windows of messages, wherein an acknowledgement messages indicates the highest consecutive sequence number message they have received, but have not already acknowledged. When using the window owner concept, the designated node to acknowledge need not acknowledge all the messages in the window, and the designated node to acknowledge could be moved as soon as an acknowledgments for one of the message in the window has been received (and thus it may be advantageous to receive an acknowledgment message sooner, rather than later).

Note, this technique of using immediate and delayed acknowledgements of messages sent to one or more nodes can be used with multicast as well as with unicast messages. For example, a sender might send windows of messages to a receive using unicast messages, and request some messages be immediately acknowledged and request the acknowledgement of some messages be delayed. In one embodiment sending unicast messages with indications of whether or not to delay acknowledgment of a message, the overall number of acknowledgment messages received by the sender is reduced.

In one embodiment, a sender can request for certain messages an immediate acknowledgment be sent or a delayed acknowledgement be sent. For example, when using an acknowledgement scheme with an acknowledgement messages indicates the highest consecutive sequence number message a node has received, delaying the acknowledgment gives additional time for more messages to be received and thus a particular acknowledgment message might become obsolete and replaced by another acknowledgment message covering a wider span of sequence numbers, and typically causing less overall acknowledgment messages to be sent. As previously mentioned, when using a windowing scheme, it may be advantageous to get an acknowledgement message sooner, rather than later. Thus, an embodiment uses a combination of delayed and immediate acknowledgment messages.

In one embodiment, a sender asks for an immediate acknowledgment only for the first message in the window (and delayed acknowledgements for the other message) so that then when the acknowledge is received the sender can move the node to acknowledge. For example, if the window size is ten and sequence numbers are one through ten, the sender asks immediate acknowledgment for message one (e.g., by indicating an immediate acknowledgment is requested in the message header or via another mechanism). For the remaining messages, the sender can indicate that acknowledgment is not needed immediately (e.g., by indicating a delayed acknowledgment is requested in the message header or via another mechanism). The receiver then can queue up an acknowledgment for messages from two through ten. In response to an internal timer expiring or another event, the receiver sends an acknowledgment message acknowledging all the other received messages, or when the receiver becomes the designated node to acknowledge the next round, these messages are implicitly acknowledged with the immediate acknowledgment message of a message from the next window of messages.

For example, in one embodiment using the above scheme, the sender does not need to wait for the acknowledgment for sequencers numbers two through ten to come through before moving the window. As soon as it gets the acknowledge for message one, the sender notes that it can move the window and sends any remaining messages in the window, and then moves the node to acknowledge to the next receiver. By the time receiver one becomes the designated node to acknowledge again, either the cumulative acknowledgement for messages two through ten might has been received or when the sender sends the first message for a new window of messages again asking for immediate acknowledge, the acknowledgment of messages two through ten would be included.

For example, assuming there are four receivers, the next time receiver one would be the designated node to acknowledge, the sender will ask for acknowledges for messages forty-one through fifty. The sender asks for immediate acknowledge for message forty-one, which if acknowledged indicates the receiver received all the intermediate messages.

Figure 2A:
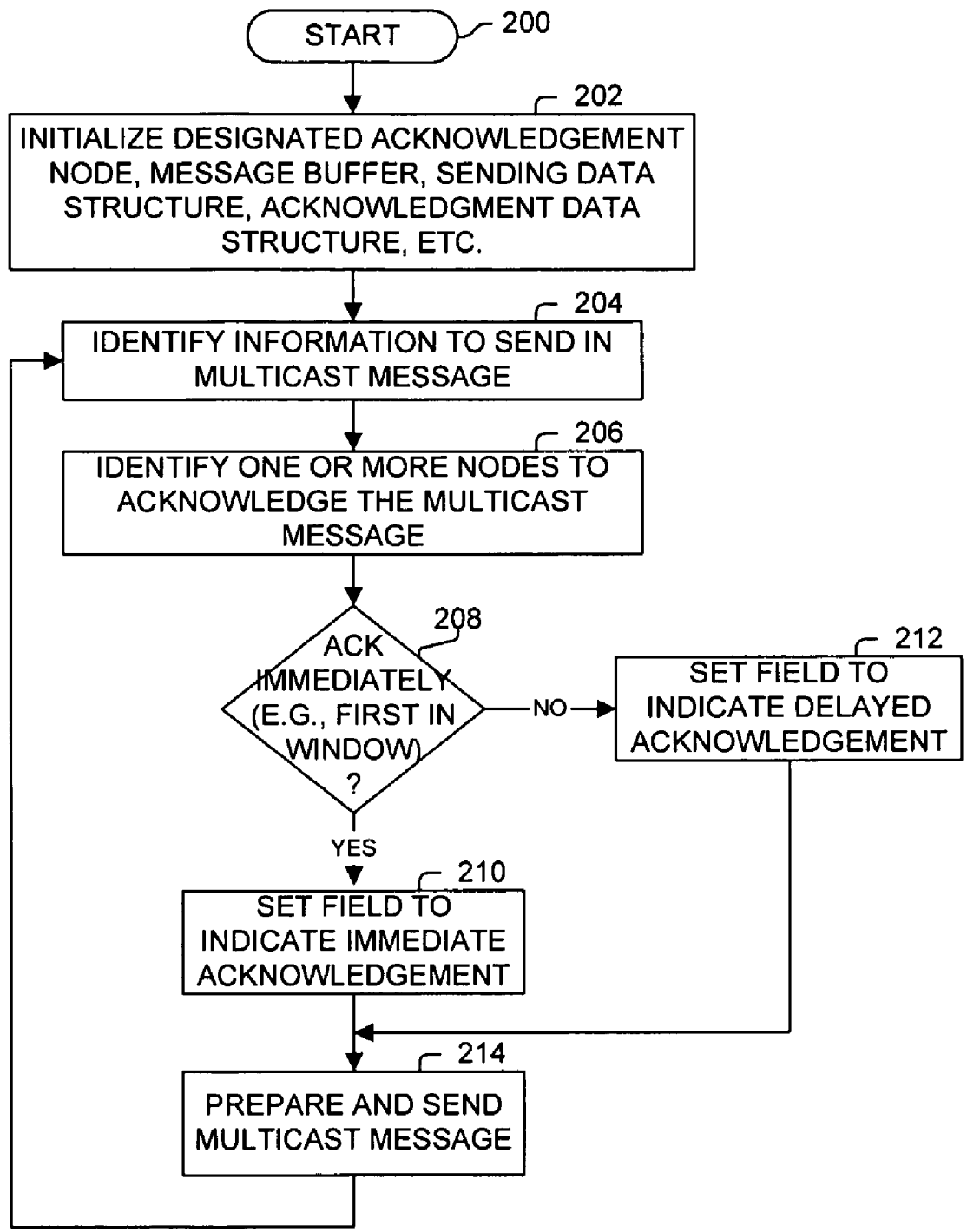
FIG. 2A is a flow diagram illustrating a process used in one embodiment for sending multicast messages.

Another example of the sending and acknowledgment of multicast messages is illustrated in FIGS. 2A-B, 3, and 4A-C. FIG. 2A is a flow diagram illustrating a process used in one embodiment for sending multicast messages. Processing begins with process block 200, and proceeds to process block 202, wherein the process is initialized, which may include such things as identifying an initial designated acknowledgement node, and initializing data structures, buffers, variables, etc. In process block 204, the information to send in a multicast message is identified. For example, this information may correspond to a gang scheduling dispatch message, a set of data (e.g., routes, configuration information, flow control information, errors, etc.) to distribute. In process block 206, one or more designated acknowledgement nodes are identified, which may include selecting one or more different nodes than the acknowledging node(s) for the last message. As determined in process block 208, if the acknowledgment is to be immediate, then in process block 210, a field is set to indicate the immediate acknowledgment; otherwise, in process block 212, this field is set to indicate a delayed acknowledgment. Then, in process block 214, the multicast message is prepared (e.g., filling in any remaining values such as sequence numbers, addresses, data, etc.) and sent. Note, in one embodiment, the multicast message uses a multicast protocol (e.g., multicast address to reach multiple nodes), while in one embodiment, the multicast message corresponds to a series of unicast messages. Processing then returns to process block 204 to process and send more messages.

Figure 4A:
FIGS. 4A-C are block diagrams illustrating various messages used in one embodiment.

FIG. 4A illustrates one such multicast or unicast message 400. As shown, message 400 includes a source address 401 (e.g., identifying the sender of message 400), a multicast or unicast destination address 402, an indication 403 of one or more nodes to acknowledge (e.g., a bitmap with each bit corresponding to a different node and identifying whether or not to acknowledge, a list, or other indication), an indication 404 of whether or not the acknowledgment should be immediate or not (e.g., a flag or other value), a sequence number 405, and typically data 406, and possibly other fields.

Figure 2B:
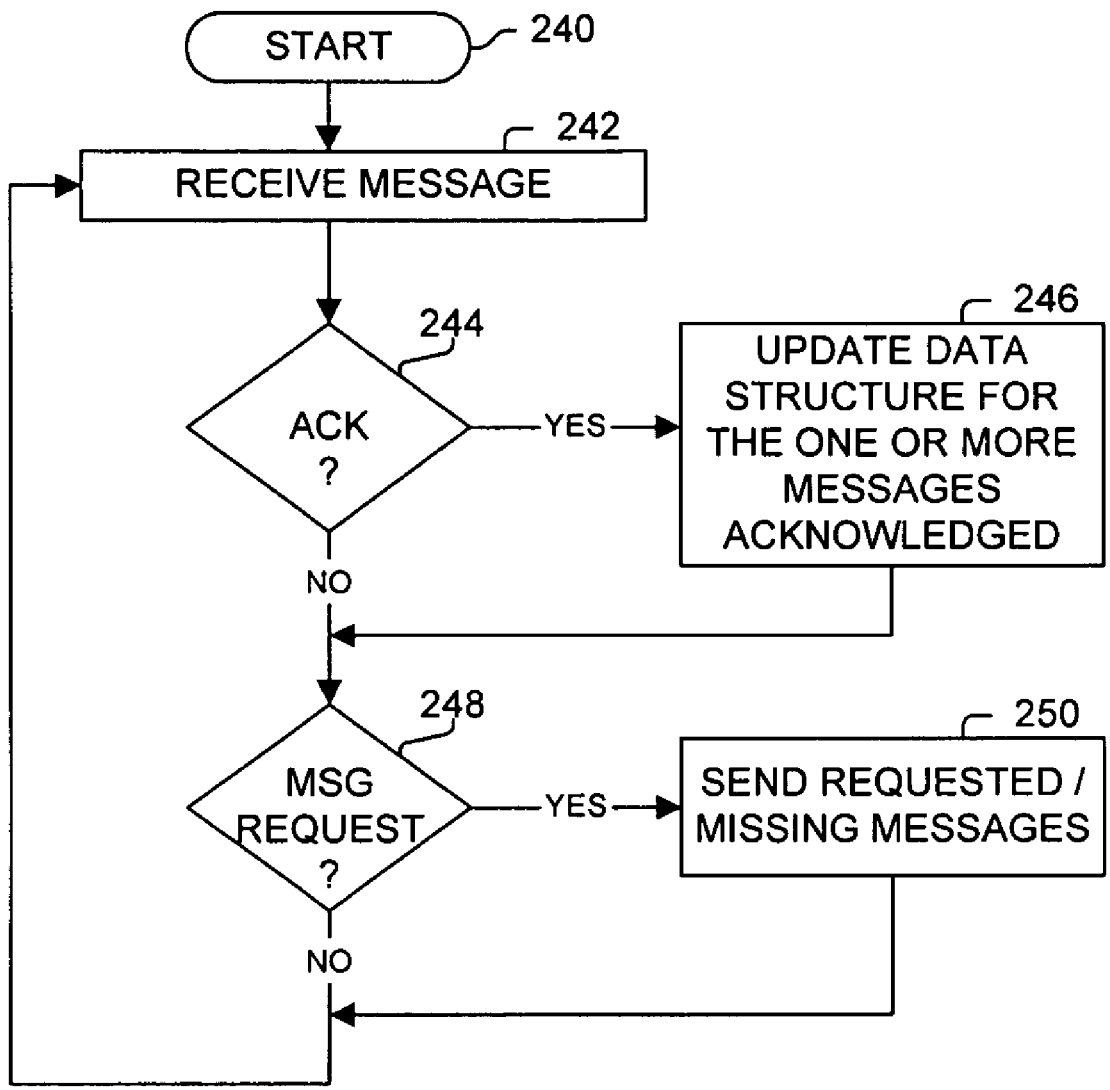
FIG. 2B is a flow diagram illustrating a process used in one embodiment for receiving and processing acknowledgment messages.

FIG. 2B is a flow diagram illustrating a process used in one embodiment for receiving and processing acknowledgment messages. Processing begins with process block 240, and proceeds to process block 242, wherein an acknowledgment message is received. As determined in process block 244, if the received message includes an acknowledgment, then in process block 246, one or more data structures are updated to indicated the one or more acknowledged messages and possibly other processing is performed. As determined in process block 248, if the message includes a request for any missing messages, then in process block 250, the missing/requested messages are sent. Processing then returns to process block 242.

Figure 4B:
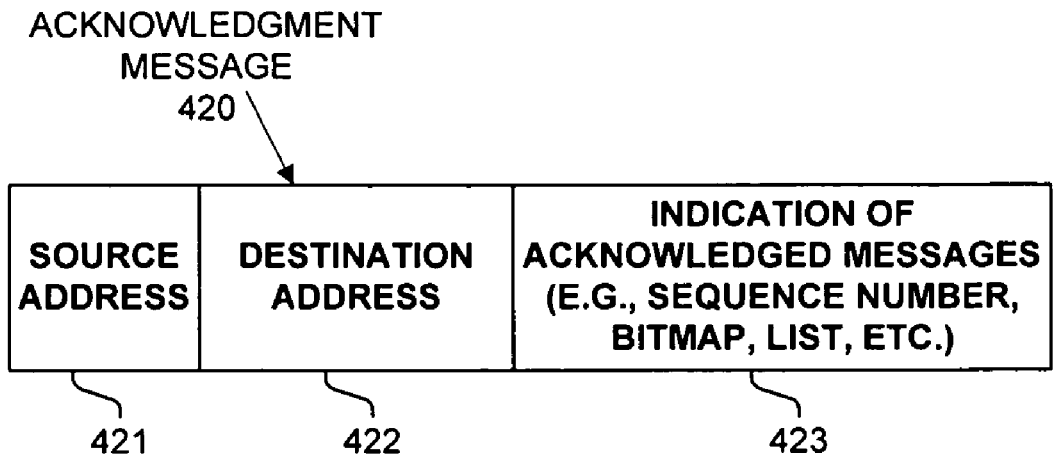

FIG. 4B illustrates one such acknowledgment message 420 used in one embodiment. As shown, acknowledgment message 420 includes a source address 421, a destination address 422, and an indication 423 of the messages being acknowledged (e.g., a sequence number, a list, a bitmap, one or more values, etc.).

Figure 4C:
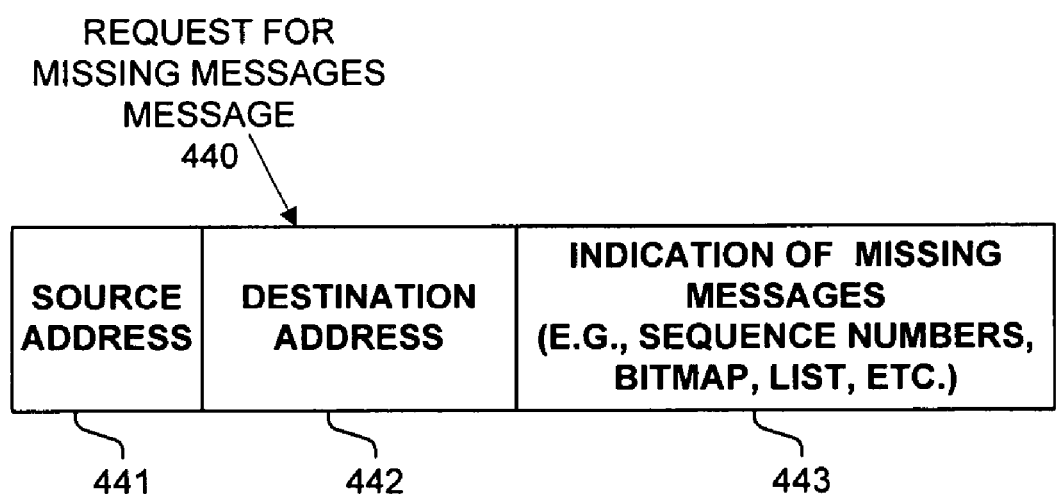

FIG. 4C illustrates one such request for missing messages message 440 used in one embodiment. As shown, request for missing messages message 440 includes a source address 441, a destination address 442, and an indication 443 of the missing or requested messages (e.g., one or more sequence numbers, a list, a bitmap, one or more values, etc.).

Figure 3:
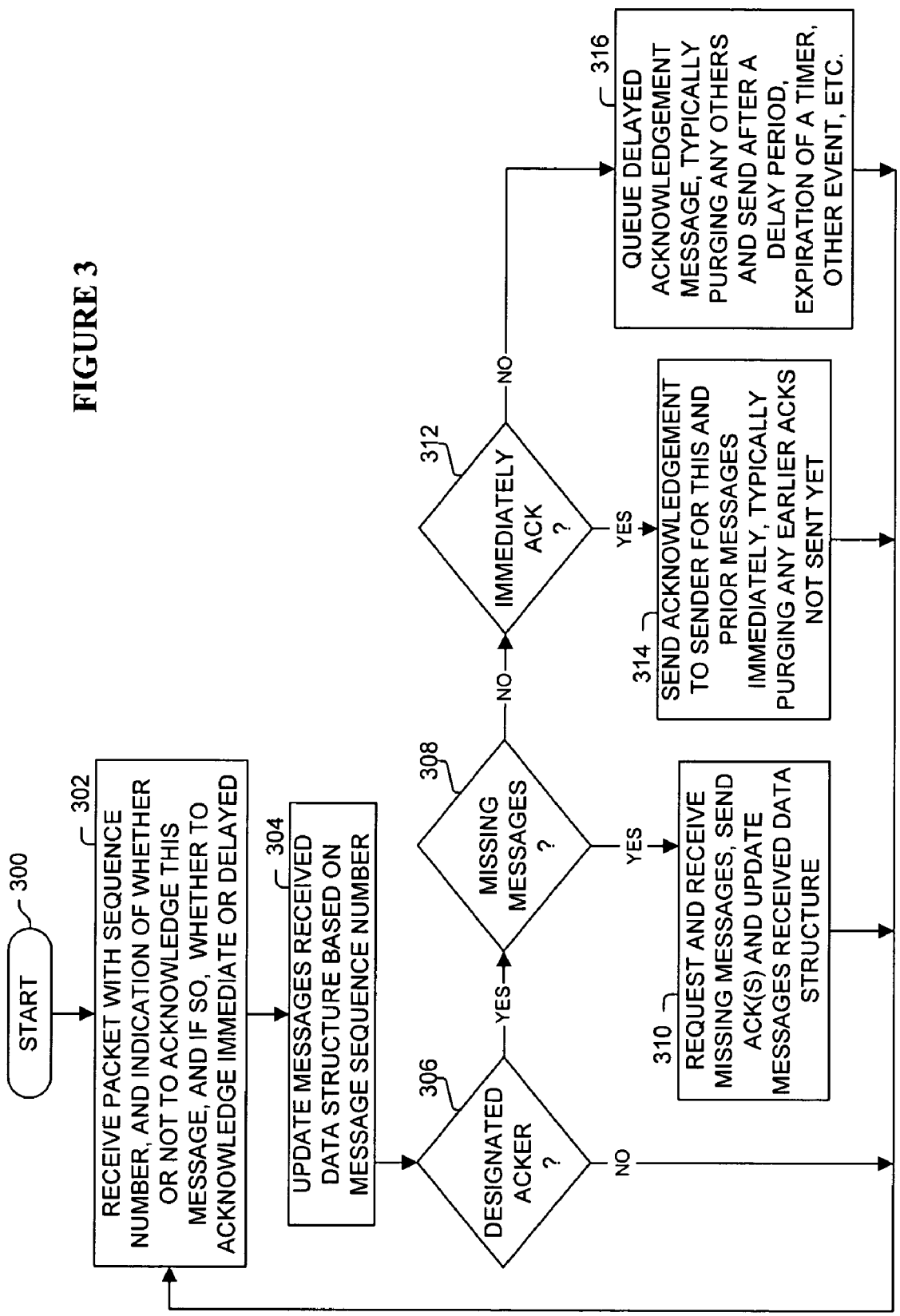
FIG. 3 is a flow diagram illustrating a process used in one embodiment for receiving and processing multicast messages and sending acknowledgement messages.

FIG. 3 is a flow diagram illustrating a process used in one embodiment for receiving and processing multicast messages and sending acknowledgment messages.

Processing begins with process block 300, and proceeds to process block 302, wherein a multicast packet is received, typically with a sequence number, an indication of whether or not this receiving node should acknowledge the message, and if so, whether the acknowledgement should be immediate or delayed, and possibly other fields. In process block 304, a messages received data structure is updated based on the sequence number of the received message.

As determined in process block 306, if the node is not designated to acknowledge the message, then processing returns to process block 302.

Otherwise, as determined in process block 308, if there are missing messages (e.g., a gap in the sequence numbers indicated as received in a data structure or identified via another mechanism), then in process block 310, these missing messages are requested, received, acknowledged, with the appropriate data structures updated, and processing returns to process block 302.

Otherwise, as determined in process block 312, if the node is not to immediately acknowledge the message, then in process block 316, the delayed acknowledgment is queued or otherwise stored for future processing with any other acknowledgments with consecutive sequence numbers purged as the acknowledgment message corresponding to this acknowledgement will serve to acknowledge these purged ones. This acknowledgment is set to be sent at a future time (e.g. in response to an expiration of a timer, after a delay period, in response to some other event, etc.) if not purged before then, and processing returns to process block 302.

Otherwise, in process block 314, an immediate acknowledgement message is sent for this message and any prior messages, with their acknowledgements purged from the delay acknowledgment mechanism, and processing returns to process block 302.

In one embodiment, the number of receiving nodes may vary over time, as nodes may join or leave a group of receiving nodes either due to the application requirements, or due to node crashes, reboots, servicing, etc. Typically, whenever the configuration of a group of receiving nodes changes, the windowing parameters such as the designated node to acknowledge set, window size etc. may be adjusted to accommodate these changes. Of course, for a node leaving a group of receiving nodes, a graceful exit with the node notifying the other nodes of such departure is preferred rather than requiring reliance on a timeout or other mechanism to detect the absence of the node.

Also, note, that for some applications, not all receiving node will send an acknowledgment message. For example, there might be some critical nodes which must receive the information, while others may just desire to be informed. Thus, in one embodiment, reliable multicast communication is performed to less than all nodes (e.g., the critical node) while at least one remaining node receive the messages (e.g., listens to the multicast address) but does not participate in the acknowledgement scheme employed.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   one or more processors; and
   memory;
   wherein said memory stores one or more instructions that, when executed by said one or more processors, perforin the steps of:
      identifying one or more but less than all of a plurality of nodes to acknowledge a multicast message, the multicast message having as its destination address a multicast address corresponding to the plurality of nodes; and
      initiating sending of the multicast message to the plurality of nodes, the multicast message including an indication of said one or more but less than all of the plurality of nodes to acknowledge the multicast message;
      wherein the multicast address is distinct from the indication of said one or more but less than all of the plurality of nodes to acknowledge the multicast message, is a non-broadcast address, and is a single address for the plurality of nodes.

2. The apparatus of claim 1, wherein the multicast message includes an indication of whether to immediately acknowledge or delay acknowledgement of the multicast message; wherein the multicast address is distinct from the indication of whether to immediately acknowledge or delay acknowledgement of the multicast message.

3. The apparatus of claim 2, wherein said steps include: setting the indication of whether to immediately acknowledge or delay acknowledgement to indicate immediate acknowledgment if the multicast message is the first message of a messaging window.

4. The apparatus of claim 3, wherein said steps include: setting the indication of whether to immediately acknowledge or delay acknowledgement to indicate delayed acknowledgment if the multicast message is not the first message of the messaging window.

5. The apparatus of claim 1, wherein said steps include: processing a received acknowledgment message corresponding to the multicast message from a node of said one or more of the plurality of nodes, and in response, identifying the multicast message and all previously sent messages as being acknowledged by the plurality of nodes.

6. The apparatus of claim 1, wherein said one or more but less than all of the plurality of nodes includes at least two of the plurality of nodes.

7. The apparatus of claim 1, wherein said steps comprise: correlating received acknowledgements from said one or more but less than all of the plurality of nodes in identifying whether or not to send a missing multicast message.

8. An apparatus comprising one or more processors and memory, wherein said memory stores one or more instructions that, when executed by the one or more processors, perform the steps of:
processing a received multicast message sent to a plurality of nodes by a sender, the multicast message including as its destination address a multicast address corresponding to the plurality of nodes with the multicast message also including an indication of at least one designated acknowledgement node of the plurality of nodes; said at least one designated acknowledgement node designating less than all of the plurality of nodes; wherein the indication of said at least one designated acknowledgement node is distinct from the multicast address; and wherein the multicast address is a non-broadcast address and is a single address for the plurality of nodes; and
in response to identifying that the indication of at least one designated acknowledgement node corresponds to the apparatus, initiating the sending of an acknowledgement message to the sender of the multicast message.

9. The apparatus of claim 8, wherein the acknowledgment message acknowledges at least one other message than the multicast message.

10. The apparatus of claim 8, wherein the multicast message includes an indication whether to immediately acknowledge or delay acknowledgement of the multicast message; wherein the multicast address is distinct from the indication of whether to immediately acknowledge or delay acknowledgement of the multicast message.

11. The apparatus of claim 10, wherein the indication whether to immediately acknowledge or delay acknowledgement of the multicast message corresponds to delay acknowledgement; and wherein said steps include: causing a delay in said sending of the acknowledgment message in response to the indication corresponding to delayed acknowledgement.

12. The apparatus of claim 8, wherein said one or more but less than all of the plurality of nodes includes at least two of the plurality of nodes.

13. An apparatus comprising one or more processors and memory, wherein said stores one or more instructions that, when executed by the one or more processors, perform the steps of:
identifying one or more but less than all of a plurality of nodes to acknowledge a message, the message including as its destination address a multicast address corresponding to the plurality of nodes; wherein the multicast address is a single address for the plurality of nodes; and
causing the message to be sent to the plurality of nodes, the message including an indication of said one or more but less than all of the plurality of nodes to acknowledge the message; wherein with the multicast address is distinct from the indication of said one or more but less than all of the plurality of nodes.

14. The apparatus of claim 13, wherein the message includes an indication of whether to immediately acknowledge or delay acknowledgement of the message, the indication of whether to immediately acknowledge or delay acknowledgement of the message being distinct from the multicast address.

15. The apparatus of claim 14, wherein said steps include: setting the indication of whether to immediately acknowledge or delay acknowledgement to indicate immediate acknowledgment based on its position in a messaging window.

16. The apparatus of claim 13, wherein said one or more but less than all of the plurality of nodes includes at least two of the plurality of nodes.

17. The apparatus of claim 13, wherein said steps comprise: correlating received acknowledgements from said one or more but less than all of the plurality of nodes in identifying whether or not to send a missing message.

18. A method performed by a node, the method comprising:
sending, by the node, a sequence of multicast messages to a plurality of nodes, including for each particular multicast message in the sequence of multicast messages:
identifying one or more but less than all of the plurality of nodes to acknowledge said particular multicast message, said particular multicast message having as its destination address a multicast address corresponding to the plurality of nodes, wherein the multicast address is distinct from an indication of said one or more but less than all of the plurality of nodes to acknowledge said particular multicast message, is a non-broadcast address, and is a single address for the plurality of nodes; and
sending said particular multicast message to the plurality of nodes, with said particular multicast message including the indication of said one or more but less than all of the plurality of nodes to acknowledge the multicast message;
wherein said operation of identifying one or more but less than all of the plurality of nodes to acknowledge said particular multicast message does not identify the same nodes of the plurality of nodes for each particular multicast message in the sequence of multicast messages.

19. The method of claim 18, wherein said identifying one or more but less than all of the plurality of nodes to acknowledge said particular multicast message is performed in a deterministic manner among multicast messages in the sequence of multicast messages.

20. The method of claim 19, wherein said deterministic manner is a round robin.

21. The method of claim 18, comprising: receiving acknowledgements; and correlating said received acknowledgements in identifying whether or not to send a missing message.

22. An apparatus comprising one or more processors and memory, wherein said memory stores one or more instructions that, when executed by the one or more processors, perform the steps of:

initiating sending of a sequence of multicast messages to a plurality of nodes, including for each particular multicast message in the sequence of multicast messages:

identifying one or more but less than all of the plurality of nodes to acknowledge said particular multicast message, said particular multicast message having as its destination address a multicast address corresponding to the plurality of nodes, wherein the multicast address is distinct from an indication of said one or more but less than all of the plurality of nodes to acknowledge said particular multicast message, is a non-broadcast address, and is a single address for the plurality of nodes; and initiating sending said particular multicast message to the plurality of nodes, with said particular multicast message including the indication of said one or more but less than all of the plurality of nodes to acknowledge the multicast message;

wherein said operation of identifying one or more but less than all of the plurality of nodes to acknowledge said particular multicast message does not identify the same nodes of the plurality of nodes for each particular multicast message in the sequence of multicast messages.

23. The apparatus of claim 22, wherein said identifying one or more but less than all of the plurality of nodes to acknowledge said particular multicast message is performed in a deterministic manner among multicast messages in the sequence of multicast messages.

24. The apparatus of claim 23, wherein said deterministic manner is a round robin.

\* \* \* \* \*

UNITED STATES PATENT AND TRADEMARK OFFICE
CERTIFICATE OF CORRECTION

PATENT NO. : 8,346,904 B2  Page 1 of 1
APPLICATION NO. : 11/495260
DATED : January 1, 2013
INVENTOR(S) : Mamillapalli et al.

It is certified that error appears in the above-identified patent and that said Letters Patent is hereby corrected as shown below:

Col. 12, Claim 1, line 49, replace "perforin" with -- perform --

Signed and Sealed this
Nineteenth Day of February, 2013

Teresa Stanek Rea
*Acting Director of the United States Patent and Trademark Office*